(12) United States Patent
Ebata

(10) Patent No.: US 12,538,035 B2
(45) Date of Patent: Jan. 27, 2026

(54) APPARATUS CAPABLE OF SUPPRESSING INFLUENCE OF FLICKER, AND METHOD OF CONTROLLING SAME

(71) Applicant: CANON KABUSHIKI KAISHA, Tokyo (JP)

(72) Inventor: Yuya Ebata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 41 days.

(21) Appl. No.: 18/777,625

(22) Filed: Jul. 19, 2024

(65) Prior Publication Data
US 2025/0039557 A1 Jan. 30, 2025

(30) Foreign Application Priority Data

Jul. 25, 2023 (JP) .................................. 2023-120621

(51) Int. Cl.
| | |
|---|---|
| *H04N 23/745* | (2023.01) |
| *H04N 23/11* | (2023.01) |
| *H04N 23/12* | (2023.01) |
| *H04N 23/73* | (2023.01) |
| *H04N 25/131* | (2023.01) |

(52) U.S. Cl.
CPC ........... *H04N 23/745* (2023.01); *H04N 23/11* (2023.01); *H04N 23/12* (2023.01); *H04N 23/73* (2023.01); *H04N 25/131* (2023.01)

(58) Field of Classification Search
CPC ........ H04N 23/11; H04N 23/12; H04N 23/73; H04N 23/745; H04N 25/131
See application file for complete search history.

(56) References Cited

U.S. PATENT DOCUMENTS

2013/0002882 A1* 1/2013 Onozawa ............... H04N 23/74
348/E5.09

FOREIGN PATENT DOCUMENTS

| | | |
|---|---|---|
| JP | 2020-129756 A | 8/2020 |
| JP | 2022-524957 A | 5/2022 |

* cited by examiner

*Primary Examiner* — Daniel M Pasiewicz
(74) *Attorney, Agent, or Firm* — Carter, DeLuca & Farrell LLP

(57) ABSTRACT

An apparatus including an image sensor that photoelectrically converts visible light and invisible light. Image data output by the image sensor is separated into visible light image data and invisible light image data. In a first process, an invisible light flicker period is detected from the invisible light image data, and the image sensor is controlled, based on the detected invisible light flicker period, such that invisible light flicker is not generated in the image data, and in a second process, a visible light flicker period is detected from the visible light image data separated in a state in which invisible light flicker is not generated in the image data, and the image sensor is controlled, based on the invisible light flicker period and the detected visible light flicker period, such that invisible light flicker and visible light flicker are not generated in the image data.

15 Claims, 16 Drawing Sheets

APPARATUS CAPABLE OF SUPPRESSING INFLUENCE OF FLICKER, AND METHOD OF CONTROLLING SAME

BACKGROUND OF THE INVENTION

Field of the Invention

The present invention relates to an apparatus that is capable of suppressing the influence of flicker, and a method of controlling the same.

Description of the Related Art

In an image capturing apparatus using an image sensor, in a case where an image of an object under illumination of a fluorescent light or a light emitting diode (LED) is captured, periodic light and dark patterns sometime appear in a captured image. This phenomenon is referred to as flicker, and the flicker is generated from all light sources that emit light and is generated due to a relationship between a blinking period of a light source and a vertical synchronizing frequency of the image capturing apparatus.

Further, in recent years, in image capturing apparatuses, such as a digital camera, a monitoring camera, and a camera mounted in a smartphone, image processing using a visible light image and an invisible light (infrared light) image is under study. The invisible light image is treated as a monochrome image which is in a region of a wavelength which cannot be sensed by human eyes and has no color information but the invisible light image is difficult to be affected by improvement of visibility in a dark place, or by haze or the like. Therefore, it is possible to use an invisible light image for image processing, such as noise reduction, contrast improvement, and haze elimination, which are performed on a visible light image.

In an image sensor which can acquire a visible light image and an invisible light image in parallel, if an infrared cut filer is used, the infrared light cannot be received, and hence the infrared cut filter cannot be used. Further, invisible light pixels sometimes affect surrounding visible light pixels. Further, an image capturing apparatus equipped with the image sensor which can acquire a visible light image and an invisible light image in parallel can be affected by visible light flicker generated by a visible light source and invisible light flicker generated by an invisible light source.

For example, cameras mounted e.g. on a smartphone include one configured to measure a distance by using a Time-of-Flight (ToF) sensor to separate, for example, a background and a person, and perform image processing, such as background blurring. In photographing inside a room, an image capturing apparatus is affected by visible light flicker and invisible light flicker, due to flicker generated by infrared light generated by the ToF sensor of a smartphone held by another person and flicker generated by an indoor illumination light source.

Therefore, in a case where flicker is detected from an image under such a situation, there is a possibility that a visible light image is affected by the invisible light flicker, and the accuracy of detecting the visible light flicker is lowered. A technique for eliminating the influence of invisible light flicker and detecting visible light flicker is described in Japanese Laid-Open Patent Publication (Kokai) No. 2020-129756 and Published Japanese Translation of PCT Internal Publication (Tokuhyo) No. 2022-524957.

The technique disclosed in Japanese Laid-Open Patent Publication (Kokai) No. 2020-129756 makes it possible to eliminate flicker of invisible light (noise light source) because the period of the invisible light flicker (noise light source) is known in advance. However, under a situation where the invisible light flicker period is not known, the accuracy of detecting the visible light flicker can be lowered due to the influence of the invisible light flicker. Alternatively, when an invisible light image is used for processing a visible light image, the processing can be affected by the invisible light flicker.

The technique disclosed in Published Japanese Translation of PCT Internal Publication (Tokuhyo) No. 2022-524957 detects flicker while eliminating the influence of infrared light by inserting an infrared cut filter when detecting flicker. However, the infrared cut filter is required, which can result in an increase in the costs.

SUMMARY OF THE INVENTION

The present invention provides an apparatus that is capable of suppressing the influence of flicker with low costs even under a situation where invisible or visible light flicker is generated.

In a first aspect of the present invention, there is provided an apparatus including an image sensor that photoelectrically converts visible light and invisible light, and a memory coupled to the at least one processor, the memory having instructions that, when executed by the at least one processor, perform the operations as: a separation unit configured to separate image data output by the image sensor into visible light image data and invisible light image data, a detection unit configured to detect flicker, and a control unit configured to execute a second process after execution of a first process, wherein in the first process, the control unit causes the detection unit to detect a flicker period of invisible light from the invisible light image data and controls the image sensor, based on the detected flicker period of invisible light, such that flicker of invisible light is not generated in the image data, and in the second process, the control unit causes the detection unit to detect a flicker period of visible light from the visible light image data separated in a state in which the image sensor is controlled such that flicker of invisible light is not generated in the image data, and controls the image sensor, based on the flicker period of invisible light and the detected flicker period of visible light, such hat flicker of invisible light and flicker of visible light from are not generated in the image data.

In a second aspect of the present invention, there is provided an apparatus including an image sensor that photoelectrically converts visible light and invisible light, and a memory coupled to the at least one processor, the memory having instructions that, when executed by the at least one processor, perform the operations as: a separation unit configured to separate image data output by the image sensor into visible light image data and invisible light image data, a detection unit configured to detect flicker, and a control unit configured to execute a second process after execution of a first process, wherein in the first process, the control unit causes the detection unit to detect a flicker period of invisible light from the invisible light image data, and thereafter, when separating the image data output by the image sensor, the control unit applies flicker correction for reducing flicker of invisible light based on the detected flicker period of invisible light, and in the second process, the control unit causes the detection unit to detect a flicker period of visible light from the visible light image data separated in a state in which the flicker correction has been applied, and controls the image sensor, based on the detected flicker period of visible light, such that flicker of visible light is not generated in the image data.

In a third aspect of the present invention, there is provided an apparatus including an image sensor that photoelectrically converts visible light and invisible light, and a memory coupled to the at least one processor, the memory having instructions that, when executed by the at least one processor, perform the operations as: a separation unit configured to separate image data output by the image sensor into visible light image data and invisible light image data, a detection unit configured to detect flicker, and a control unit configured to execute a first process after execution of a second process, wherein in the second process, the control unit causes the detection unit to detect a flicker period of visible light from the visible light image data, and controls the image sensor, based on the detected flicker period of visible light, such that flicker of visible light is not generated in the image data, and in the first process, the control unit causes the detection unit to detect a flicker period of invisible light from the invisible light image data separated in a state in which the image sensor is controlled such that flicker of visible light is not generated in the image data, and controls the image sensor, based on the flicker period of visible light and the detected flicker period of invisible light, such that flicker of invisible light and flicker of visible light are not generated in the image data.

In a fourth aspect of the present invention, there is provided an apparatus including an image sensor that photoelectrically converts visible light and invisible light, and a memory coupled to the at least one processor, the memory having instructions that, when executed by the at least one processor, perform the operations as: a separation unit configured to separate image data output by the image sensor into visible light image data and invisible light image data, a detection unit configured to detect flicker, and a control unit configured to execute a first process after execution of a second process, wherein in the second process, the control unit causes the detection unit to detect a flicker period of visible light from the visible light image data, and thereafter, when separating the image data output by the image sensor, the control unit applies flicker correction for reducing flicker of visible light based on the detected flicker period of visible light, and in the first process, the control unit causes the detection unit to detect a flicker period of invisible light from the invisible light image data separated in a state in which the flicker correction has been applied, and controls the image sensor, based on the detected flicker period of invisible light, such that flicker of invisible light is not generated in the image data.

According to the present invention, it is possible to suppress the influence of flicker with low costs even under a situation where invisible or visible light flicker is generated.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
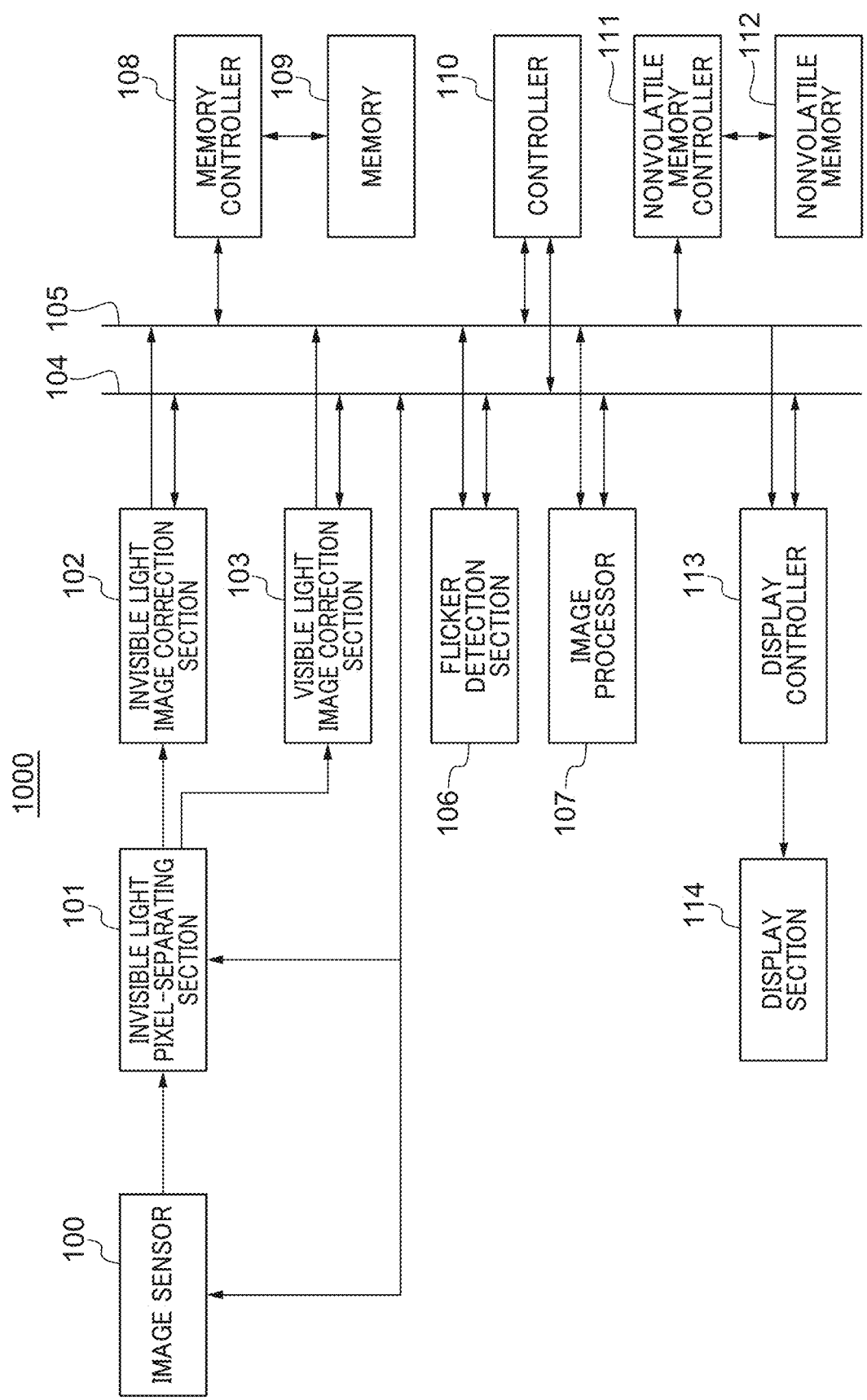
FIG. 1 is a block diagram showing an example of an image capturing apparatus.

FIG. 1 is a block diagram showing an example of an image capturing apparatus according to a first embodiment of the present invention. Preferred embodiments of the present invention will be described below, by taking a digital camera as an example of the image capturing apparatus. However, the present invention can be applied to a desired electronic apparatus having an image capturing function. The electronic apparatus includes a computer apparatus (such as a personal computer, a tablet computer, a media player, and a personal digital assistant (PDA)), a mobile phone, a smartphone, a robot, a drone, an in-vehicle camera, a monitoring camera, and so forth. These are only examples, but the present invention can be applied to any other electronic apparatuses. Note that the embodiments described below are not intended to limit the scope of the present invention claimed in claims. Further, a plurality of features are described in the embodiments, but not all of the features described in the embodiments are absolutely essential to solution according to the invention, and the plurality of features can be combined as required.

As shown in FIG. 1, the image capturing apparatus, denoted by reference numeral 1000, includes an image sensor 100, an invisible light pixel-separating section 101, an invisible light image correction section 102, a visible light image correction section 103, a control bus 104, a data bus 105, and a flicker detection section 106. Further, the image capturing apparatus 1000 includes an image processor 107, a memory controller 108, a memory 109, a controller 110, a nonvolatile memory controller 111, a nonvolatile memory 112, a display controller 113, and a display section 114. Further, although not shown, the image capturing apparatus 1000 includes an analog-to-digital converter, a compression/expansion section, and an external recording section. The analog-to-digital converter converts analog signals output from a sensor to digital signals. The compression/expansion section compresses image data e.g. in the JPEG or MPEG format, or expands the compressed data.

The external recording section records so-called RAW data (image data output from the visible light image correction section 103), before being developed by the image processor 107, in an external medium. Further, the external recording section records invisible light RAW data (image data output from the invisible light image correction section 102), before being developed by the image processor 107, JPEG data, MPEG data, and so forth, in the external medium.

The image sensor 100 is an optical device, such as a charge coupled device (CCD) or a complementary metal-oxide-semiconductor (CMOS) sensor, which converts an object image as light received through color filters and an infrared filter to electrical signals and generates image data. The image sensor 100 as image capturing means outputs an image including visible light and invisible light.

Figure 2:
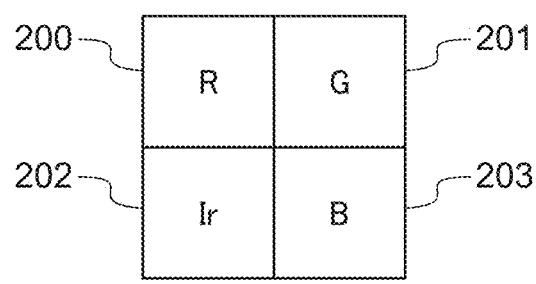
FIG. 2 is a diagram showing an example of arrangement of color filters and an infrared filter in an image sensor.

FIG. 2 is a diagram showing pixels in the image sensor 100 and an example of arrangement of the color filters and the infrared filter. The image sensor 100 has a plurality of pixels which are arranged in a two-dimensional matrix. Units, each formed by a red color filter 200, a green color filter 201, a blue color filter 203, and an infrared filter 202, which are disposed on pixels, are arrayed in a two-dimensional matrix.

The color filters are arranged such that the respective color regions (filter portions) of red (R), green (G), and blue (B) are disposed on respective pixels in a predetermined pattern. The color filter basically has a peak of the light transmittance in a wavelength band of each color and blocks transmission of light in the wavelength bands of the other colors. As for the infrared filter, an infrared region (filter portion) is disposed in association with each pixel. The infrared filter basically has a peak of the light transmittance in an infrared wavelength band and blocks transmission of light in the other wavelength bands.

The invisible light pixel-separating section 101 (see FIG. 1) as a separation unit separates an image output from the image sensor 100 into a visible light image and an invisible light image. The invisible light pixel-separating section 101 generates visible light image data (R', G', B') by performing calculation by using equations (1), (2), and (3) on invisible light (Ir) pixels corresponding to the infrared filter 202 and outputs the generated visible light image data to the visible light image correction section 103. Further, at this time, the invisible light pixel-separating section 101 replaces the invisible light (Ir) pixels corresponding to the infrared filter 202 with visible light pixels in the equation (2) and outputs the visible light image data to the visible light image correction section 103:

$$R' = R - Ir * \alpha r \quad (1)$$

$$G' = G - Ir * \alpha g \quad (2)$$

$$B' = B - Ir * \alpha b \quad (3)$$

In these equations, αr, αg, and αb are coefficients each indicating a ratio of the degree of subtraction of the Ir pixel component from each of pixels (R, G, B) and each have a value from 0 to 1. These coefficients αr, αg, and αb are coefficients for eliminating the infrared light that cannot be cut by the color filters. Alternatively, the coefficients αr, αg, and αb are coefficients for eliminating the Ir components in a case where the Ir pixel affects each pixel (R, G, B) (electric charge of the Ir pixel leaking into each of pixels (R, G, B)) due to the structure of the image sensor 100.

Note that the coefficients αr, αg, and αb can also be used as the coefficients that are held by each line or each unit of a plurality of lines to perform invisible light flicker correction (described hereinafter) based on the flicker period such that a dark line has a brightness equivalent to a bright line.

Further, the invisible light pixel-separating section 101 generates Ir image data (Ir') by performing calculation by an equation (4) using the visible light pixels and outputs only the Ir pixel corresponding to the infrared filter 202 to the invisible light image correction section 102. Alternatively, the invisible light pixel-separating section 101 replaces all of the visible light pixels corresponding to the filters 200, 201, and 203 with Ir pixels so as to make the number of pixels equal between the visible light image and the Ir image and outputs the Ir image data to the invisible light image correction section 102:

$$Ir' = Ir - (R * \beta r + G * \beta g + B * \beta b) \quad (4)$$

In this equation, βr, βg, and βb are coefficients each indicating a ratio of the degree of subtraction of the visible light component from the Ir pixel and each have a value from 0 to 1. These coefficients βr, βg, and βb are coefficients for eliminating the visible light which cannot be cut by the infrared filter. Alternatively, the coefficients βr, βg, and βb are coefficients for eliminating the visible light components in a case where each of the pixels (R, G, B) affects the Ir pixel (electric charge of each of the pixels (R, G, B) leaking into the Ir pixel) due to the structure of the image sensor 100.

Note that the coefficients βr, βg, and βb can also be used as the coefficients that are held by each line or each unit of a plurality of lines to perform visible light flicker correction based on the flicker period such that a dark line has a brightness equivalent to a bright line.

In the present embodiment, the description is given assuming that the coefficients βr, βg, and βb are equal to 0. Note that the method of separating the visible light image and the invisible light image, which is used by the invisible light pixel-separating section 101, is not limited to the above-described method, but any other suitable method and equations can be used.

An image output from the image sensor 100 is separated into a visible light image and an invisible light image by the invisible light pixel-separating section 101 as the separation unit. Image data of invisible light (invisible light image data) and image data of visible light (visible light image data) are output from the invisible light pixel-separating section 101.

The invisible light image correction section 102 performs processing, such as pixel correction, black level correction, shading correction, and flaw correction, on the invisible light image data output from the invisible light pixel-separating section 101 to generate corrected invisible light image data. The visible light image correction section 103 performs processing, such as pixel correction, black level correction, shading correction, and flaw correction, on the visible light image data output from the invisible light pixel-separating section 101 to generate corrected visible light image data. Hereafter, the invisible light image data and the visible light image data, refer to the corrected invisible light image data and the corrected visible light image data, respectively, when no specific discrimination is made between the data before correction and the data after correction.

Further, a direct memory access controller (DMAC), not shown, is connected to the data bus 105. The invisible light image data and the visible light image data are written into the memory 109 by the DMAC via the memory controller 108.

The control bus 104 is a control bus for accessing, from the controller 110, the image sensor 100, the invisible light pixel-separating section 101, the invisible light image correction section 102, the visible light image correction section 103, the flicker detection section 106, the image processor 107, and the display controller 113. The control bus 104 further accesses the memory controller 108 and the nonvolatile memory controller 111.

The data bus 105 transfers data between the memory controller 108 or the nonvolatile memory controller 111, and the controller 110, the invisible light image correction section 102, the visible light image correction section 103, the flicker detection section 106, the image processor 107, and the display controller 113.

The invisible light image data and the visible light image data are read out from the memory 109 by the DMAC, not shown, which is connected to the data bus 105, via the memory controller 108. The flicker detection section 106 as detecting means detects flicker of visible light (hereinafter referred to as the visible light flicker) from the visible light image data. Further, the flicker detection section 106 detects flicker of invisible light (hereinafter referred to as the invisible light flicker) from the invisible light image data. The flicker detection method used by the flicker detection section 106 will be described hereinafter with reference to FIG. 8.

The image processor 107 performs processing, such as white balance adjustment, magnification chromatic aberration correction, gamma correction, luminance/color generation processing, geometric deformation, and noise reduction, on the visible light image data stored in the memory 109. Further, the image processor 107 performs processing, such as gamma correction, luminance/color generation processing, geometric deformation, and noise reduction, on the invisible light image data stored in the memory 109. Further, the image processor 107 synthesizes the visible light image data and the invisible light image data. With this synthesis, noise reduction and contrast improvement are realized.

In the noise reduction, noise of the visible light image data is eliminated by using e.g. a composite Bilateral Filter (BF) and making use of the invisible light image data. The composite BF uses all edge information of the invisible light image data and the visible light image data, and hence unclear edges are interpolated in the visible light image data, whereby edge preservation property and noise elimination capability are improved.

In the contrast improvement, for example, histograms in pixel values of the visible light image data and the invisible light image data are acquired. Then, in a case where the histogram of the visible light image data (a horizontal axis represents the pixel value, and a vertical axis represents a frequency) shows the distribution in a narrower range than the histogram of the invisible light image data, it is judged that the contrast is low, and contrast improving processing is performed. For example, in a case where a ratio m in an equation (5) is smaller than 1, this corresponds to the case where the histogram of the visible light image data shows the distribution in a narrower range than the histogram of the invisible light image data:

$$m = \text{the histogram range of the visible} \quad (5)$$
$$\text{light image data (horizontal axis)/the histogram range}$$
$$\text{of the invisible light image data (horizontal axis)}$$

The image processor 107 extracts a luminance signal from the visible light image data and further performs wavelet transform on the luminance signal to thereby separate the luminance signal into a low-frequency component and a high-frequency component. The image processor 107 obtains the low-frequency component by aligning the histogram having a magnitude of the gradient in a space direction thereof along the histogram having a magnitude of the gradient of the invisible light image data. The image processor 107 calculates a luminance value of the low-frequency component by using an equation (6) based on the resultant low-frequency component and a value of the original low-frequency component (of the visible light image data):

$$\text{The luminance value of the low-frequency component} = \quad (6)$$
$$(\text{the low-frequency component obtained by aligning the}$$
$$\text{histogram} * m + \text{the original low-frequency component} * (1 - m))/2$$

Further, the image processor 107 calculates a luminance value of the high-frequency component by using an equation (7):

$$\text{The luminance value of the high-frequency component} = \quad (7)$$
$$(\text{the high-frequency component of the invisible light image data} * m +$$
$$\text{the original low-frequency component} * (1 - m))/2$$

Further, the image processor 107 performs inverse wavelet transform on the luminance value of the low-frequency component and the luminance value of the high-frequency component to thereby generate an image which is improved in contrast. Further, the invisible light image data, the visible light image data, and the processed image data are written into and read from the memory 109 by the DMAC, not shown, which is connected to the data bus 105, via the memory controller 108. Note that for the noise reduction and the contrast improvement, which are performed by the image processor 107, any other suitable method can be employed insofar as it does not depart from the scope thereof.

The memory controller 108 writes and reads data into and from the memory 109 according to instructions from the controller 110, the invisible light image correction section 102, the visible light image correction section 103, the flicker detection section 106, the image processor 107, and the display controller 113. The memory 109 is a storage device having a sufficient storage capacity to store data, such as a predetermined number of still images and a predetermined time period of moving images and voice, constants for the operation of the controller 110, programs, and so forth, and is implemented by a dynamic random access memory (DRAM) or the like.

The nonvolatile memory controller 111 writes and reads data into and from the nonvolatile memory 112 according to an instruction from the controller 110. The nonvolatile memory 112 is an electrically erasable and recordable memory, and for example, an electrically erasable programmable read-only memory (EEPROM) is used. The nonvolatile memory 112 stores constants for the operation of the controller 110, programs, and so forth.

The controller 110 is implemented by a microcomputer that controls the operation of the image capturing apparatus 1000, or the like. The controller 110 provides a variety of instructions to each of functional blocks forming the image capturing apparatus 1000 and executes a variety of control processes. The controller 110 controls the processors connected via the control bus 104. The controller 110 realizes the processes by executing the programs recorded in the nonvolatile memory 112.

The display controller 113 controls display of image data and a user interface (UI) on the display section 114. The display section 114 is implemented by a liquid crystal panel, an organic electroluminescence (EL) panel, or the like, and displays the image data, the UI, and so forth.

Figure 3:
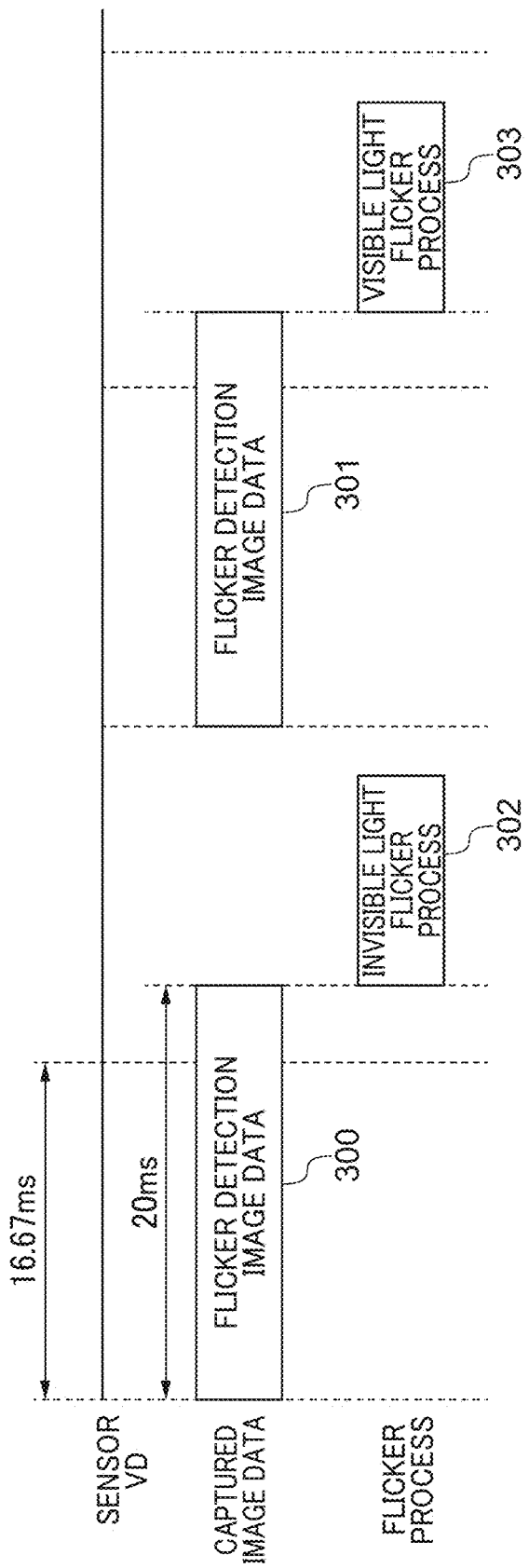
FIG. 3 is a timing diagram of a flicker suppression process in a first embodiment.

FIG. 3 is a timing diagram of a flicker suppression process. The flicker suppression process includes processes for acquiring flicker detection image data 300 and 301, an invisible light flicker process 302, and a visible light flicker process 303.

The flicker suppression process in FIG. 3 is executed during live view (LV) or when photographing is started. For example, the flicker suppression process is executed when the live view is started in accordance with powering-on of the image capturing apparatus 1000. Alternatively, the flicker suppression process can be executed before the start of actual photographing based on a photographing instruction. Note that the flicker suppression process is executed at least once. By repeatedly executing the flicker suppression process a plurality of number of times, the flicker detection accuracy is improved.

Referring to FIG. 3, a horizontal axis represents the time. A vertical synchronization (VD) signal of the image sensor 100 for LV, captured image data, and the flicker process are illustrated in the mentioned order along a vertical axis from the top.

The process for acquiring the flicker detection image data 300, the invisible light flicker process 302 (described hereinafter with reference to FIG. 6), the process for acquiring the flicker detection image data 301, and the visible light flicker process 303 (described hereinafter with reference to FIG. 7) are sequentially executed in the mentioned order.

After execution of the invisible light flicker process 302 (first process), the visible light flicker process 303 (second process) is executed. Normally, the process for acquiring the flicker detection image data 301 is started after execution of the invisible light flicker process 302 and at a timing of the next VD signal.

An outline of the process is as follows: When the flicker detection image data 300 is acquired, and the invisible light flicker process 302 is executed using the flicker detection image data 300 (described hereinafter with reference to FIGS. 6 and 8), the invisible light flicker period is detected. Then, the flicker detection image data 301 is acquired based on the detected invisible light flicker period under a condition in which the invisible light flicker is suppressed. Then, when the visible light flicker process 303 is executed using the flicker detection image data 301 (described hereinafter with reference to FIGS. 7 and 8), the visible light flicker period is detected. Then, the image sensor 100 is controlled based on the invisible light flicker period and the visible light flicker period, whereby an image is obtained on which the invisible light flicker and the visible light flicker are both suppressed.

Figure 4:
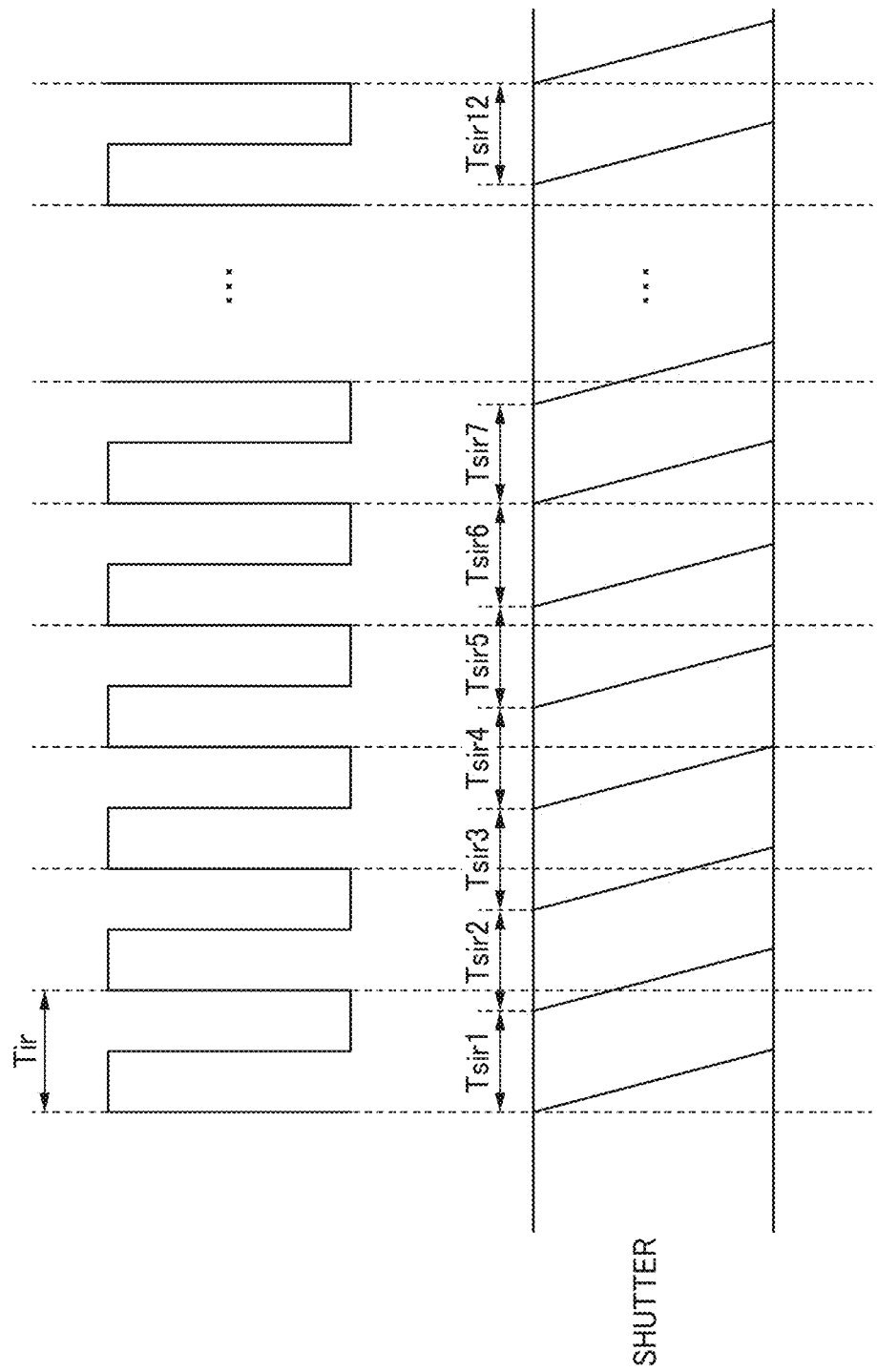
FIG. 4 is a timing diagram showing an example of an operation performed when flicker detection image data is acquired.

FIG. 4 is a timing diagram showing an example of an operation performed when flicker detection image data is acquired. A horizontal axis represents the time. FIG. 4 shows the flicker detection image data 300 as an example of the acquired flicker detection image data.

In the present embodiment, exposure is performed 12 times during 20 ms, and one exposure time Tsir (Tsir1 to Tsir12) is set to Tsir=1.67 ms (=20 ms/12). The exposure times Tsir1 to Tsir12 are set to the same value.

The illustrated example in FIG. 4 shows that the light source is blinking at high speed at an invisible light flicker period Tir (2 ms in the present embodiment). The controller 110 operates the image sensor 100 at a high shutter speed and acquires image data by performing exposure 12 times so as to detect the invisible light flicker.

At this time, the controller 110 can read out pixels at high speed by adding the number of pixels in the horizontal direction and thinning the number of pixels in the vertical direction within the sensor. Note that the flickering period of the fluorescent light is twice the period of a commercial alternating current (AC) power source. Therefore, as the exposure time, a common multiple of a value of ¹/₁₀₀ and a value of ¹/₁₂₀ are set. Further, this exposure time is set to a value suitable for detecting screen flicker generated in a case where a blinking light source using pulse width modulation (PWM), such as an LED illumination, is used.

However, the above-mentioned set value of the exposure time is an example, and any other value can be employed. Further, simultaneously with readout of the flicker detection image data 300, an image can be read out for the LV from the sensor using lines which have not been used for flicker detection (thinned vertical lines) and be used for the LV display.

Figure 5:
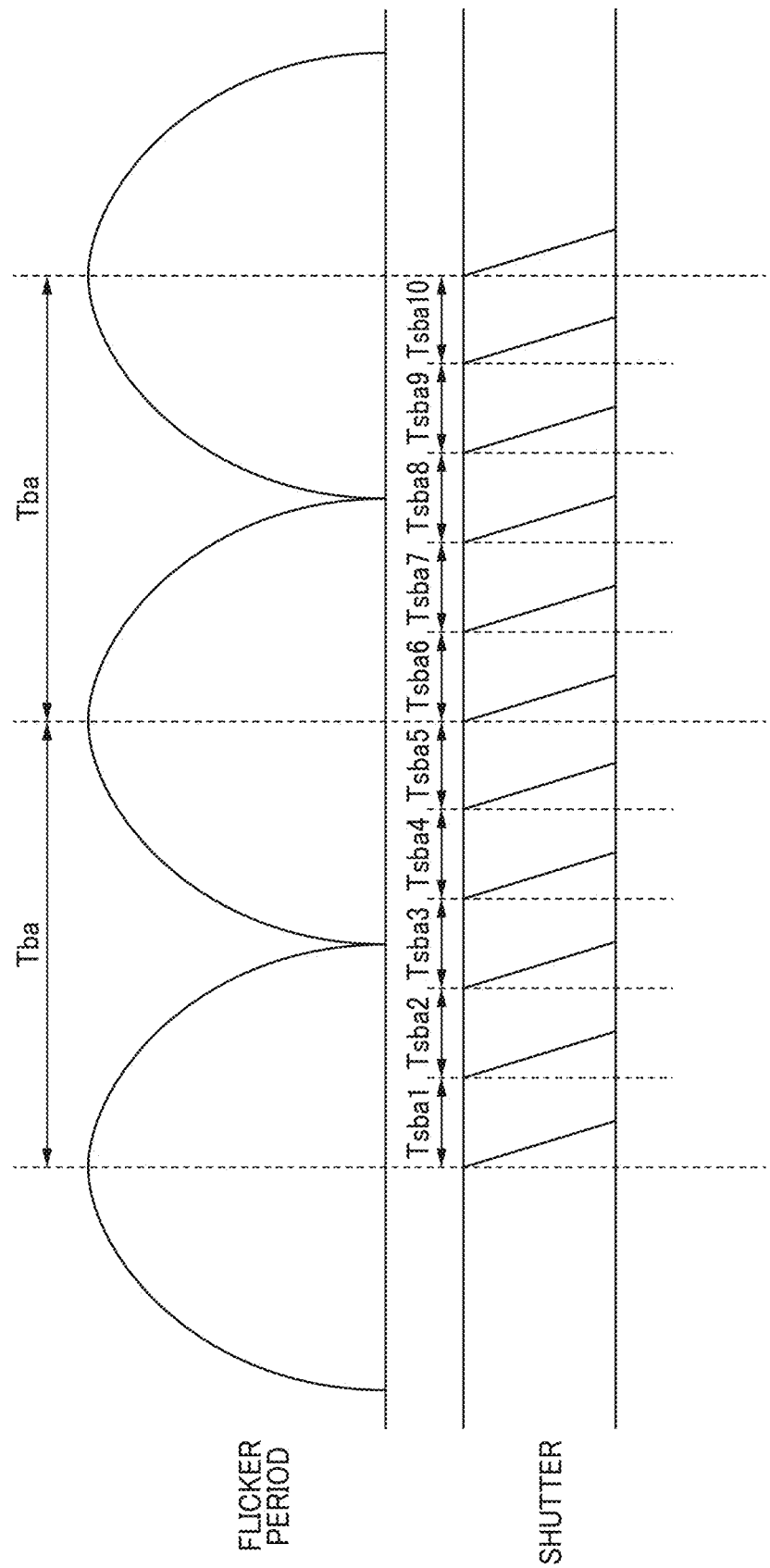
FIG. 5 is a timing diagram showing an example of an operation performed when flicker detection image data is acquired.

FIG. 5 is a timing diagram showing an example of the operation performed when flicker detection image data is acquired. A horizontal axis represents the time. FIG. 5 shows the flicker detection image data 301 as an example of the acquired flicker detection image data. An upper stage of FIG. 5 shows a visible light flicker period Tba (10 ms in the first embodiment: 100 Hz), and a lower stage of FIG. 5 shows shutter timings of a total of 10 frames at the exposure times Tsba (Tsba1 to Tsba10) of the flicker detection image data 301.

In the present embodiment, exposure is performed 10 times during 20 ms. The exposure times Tsba (Tsba1 to Tsba10) are set to the same value. In a case where the invisible light flicker period is known, the same value as the known invisible light flicker period is set to the exposure time Tsba. In a case where the invisible light flicker period has not been known, a predetermined value is set to the exposure time Tsba. In the present embodiment, since the invisible light flicker process 302 is executed first, the invisible light flicker period has been known (the invisible light flicker period Tir=2 ms). Therefore, (Tir=2 ms) is set to the one exposure time Tsba. That is, this value of 2 ms is a value calculated by executing the invisible light flicker process 302 (described hereinafter with reference to FIG. 6).

Thus, if the invisible light flicker period is known, the exposure time is set to the known value, whereby it is possible to obtain an image from which the invisible light flicker has been eliminated. This improves the accuracy of detecting the visible light flicker.

Note that simultaneously with readout of the flicker detection image data 301, an image can be read out for the LV from the sensor using lines which have not been used for flicker detection (thinned vertical lines) and used for the LV display.

Figure 6:
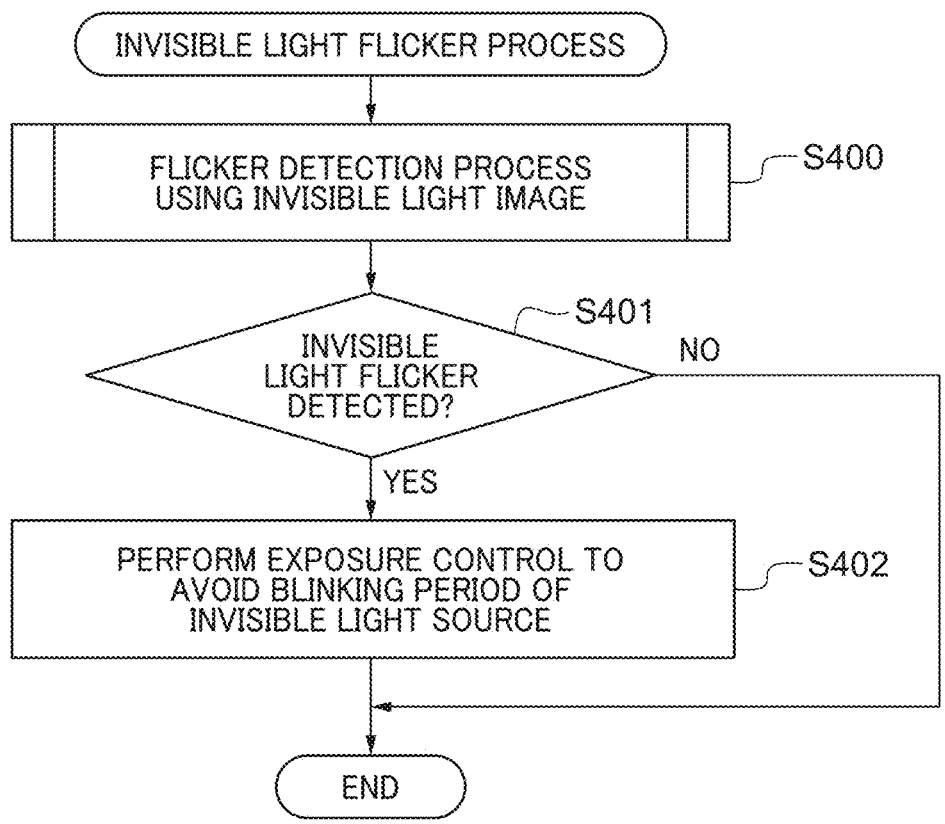
FIG. 6 is a flowchart of an invisible light flicker process in the first embodiment.

FIG. 6 is a flowchart of the invisible light flicker process. This process is realized by a central processing unit (CPU) included in the controller 110 (control unit) that loads a program stored in the nonvolatile memory 112 into a random access memory (RAM) included in the controller 110 and executes the loaded program. This process is started when the process in FIG. 3 is started. In a case where the process in FIG. 3 is executed a plurality of number of times, the invisible light flicker process (FIG. 6) executed for the second and subsequent times is started after termination of the visible light flicker process (see FIG. 7).

First, the controller 110 acquires the flicker detection image data 300 (see FIG. 3). When images read out from the image sensor 100 a plurality of number of times are separated by the invisible light pixel-separating section 101, the invisible light image data is obtained, and data obtained by processing the invisible light image data by the invisible light image correction section 102 is the flicker detection image data 300.

In a step S400, the controller 110 detects an invisible light flicker period by executing a flicker detection process (FIG. 8), described hereinafter, using the flicker detection image data 300 and proceeds to a step S401.

In the step S401, the controller 110 determines, based on the invisible light flicker period detected in the preceding step S400, whether or not invisible light flicker is generated. Here, if the detected invisible light flicker period is equal to 0, it is determined that invisible light flicker is not generated, whereas if the detected invisible light flicker period is not equal to 0, it is determined that invisible light flicker is generated.

Then, if it is determined that invisible light flicker is not generated (NO to the step S401), the controller 110 terminates the invisible light flicker process (FIG. 6). If it is determined that invisible light flicker is generated (YES to the step S401), the controller 110 proceeds to a step S402.

In the step S402, the controller 110 controls the image sensor 100, based on the invisible light flicker period detected in the step S400, to prevent invisible light flicker from being generated in a captured image, followed by terminating the invisible light flicker process (FIG. 6). For example, the controller 110 performs exposure control by using an electronic shutter or a mechanical shutter, not shown, of the image sensor 100 such that the blinking period of the invisible light source is avoided. Specifically, the controller 110 can set the shutter speed to the same value as the invisible light flicker period.

Figure 7:
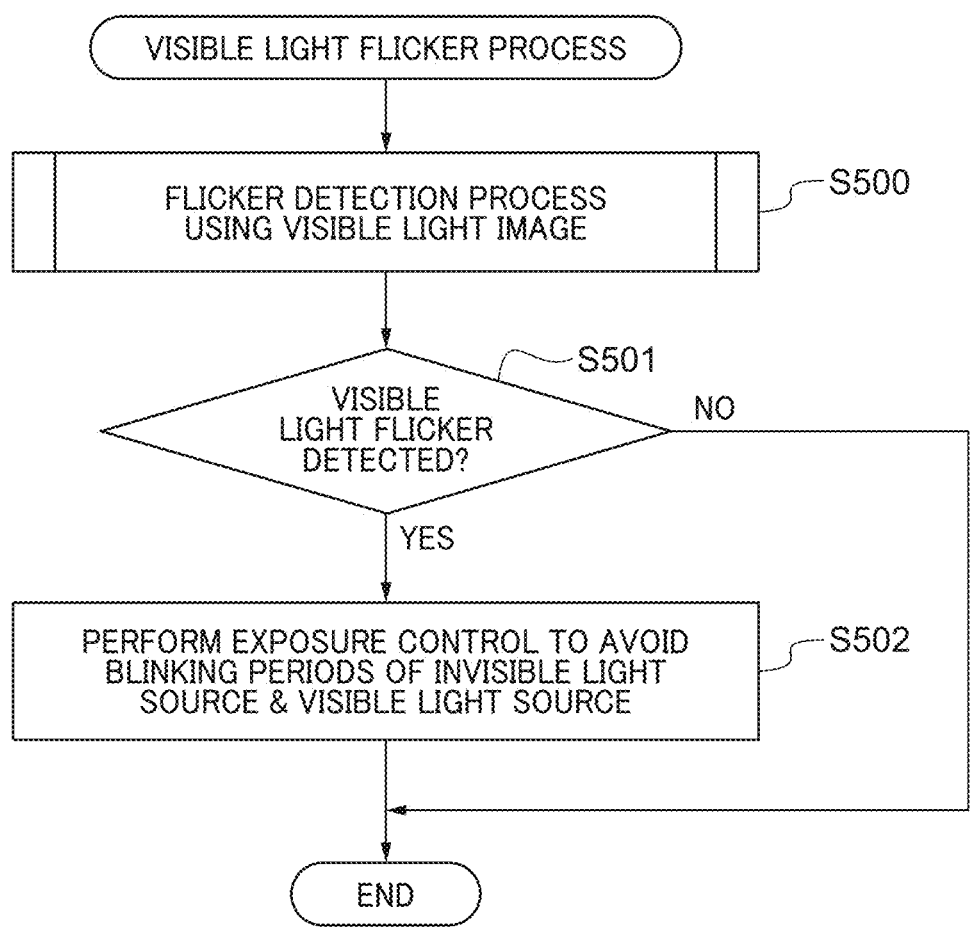
FIG. 7 is a flowchart of a visible light flicker process in the first embodiment.

FIG. 7 is a flowchart of the visible light flicker process. The execution unit of this process is the same as that of the invisible light flicker process (FIG. 6). This process is executed after termination of the invisible light flicker process (FIG. 6).

First, the controller 110 acquires the flicker detection image data 301 (see FIG. 3). At this time, if it is determined in the step S401 of the invisible light flicker process in FIG. 6 that the invisible light flicker is generated, the flicker detection image data 301 is acquired in a state in which the processing in the step S402 is applied (in a state in which the invisible light flicker is suppressed). When images read out from the image sensor 100 a plurality of number of times in the state in which the processing in the step S402 is applied are separated by the invisible light pixel-separating section 101, the visible light image data is obtained. Data obtained by processing this visible light image data by the visible light image correction section 103 is the flicker detection image data 301.

In a step S500, the controller 110 detects a visible light flicker period by executing the flicker detection process (see FIG. 8), described hereinafter, using the flicker detection image data 301 and proceeds to a step S501.

In the step S501, the controller 110 determines, based on the visible light flicker period detected in the preceding step S500, whether or not visible light flicker is generated. Here, if the detected visible light flicker period is equal to 0, it is determined that invisible light flicker is not generated, whereas if the detected visible light flicker period is not equal to 0, it is determined that visible light flicker is generated.

Then, if it is determined that visible light flicker is not generated (NO to the step S501), the controller 110 terminates the visible light flicker process (FIG. 7). If it is determined that visible light flicker is generated (YES to the step S501), the controller 110 proceeds to a step S502.

In the step S502, the controller 110 controls the image sensor 100, based on the invisible light flicker period detected in the step S400 and the visible light flicker period detected in the step S500, so as to prevent the invisible light flicker and the visible light flicker from being generated in a captured image. After that, the controller 110 terminates the visible light flicker process (FIG. 7). For example, the controller 110 performs exposure control by using the electronic shutter or the mechanical shutter, not shown, of the image sensor 100, based on the common multiple of the invisible light flicker period and the visible light flicker period, such that the blinking periods of the invisible light source and the visible light source are avoided. Specifically, the controller 110 can set the shutter speed to the same value as the common multiple (such as the least common multiple) of the invisible light flicker period and the visible light flicker period.

Figure 8:
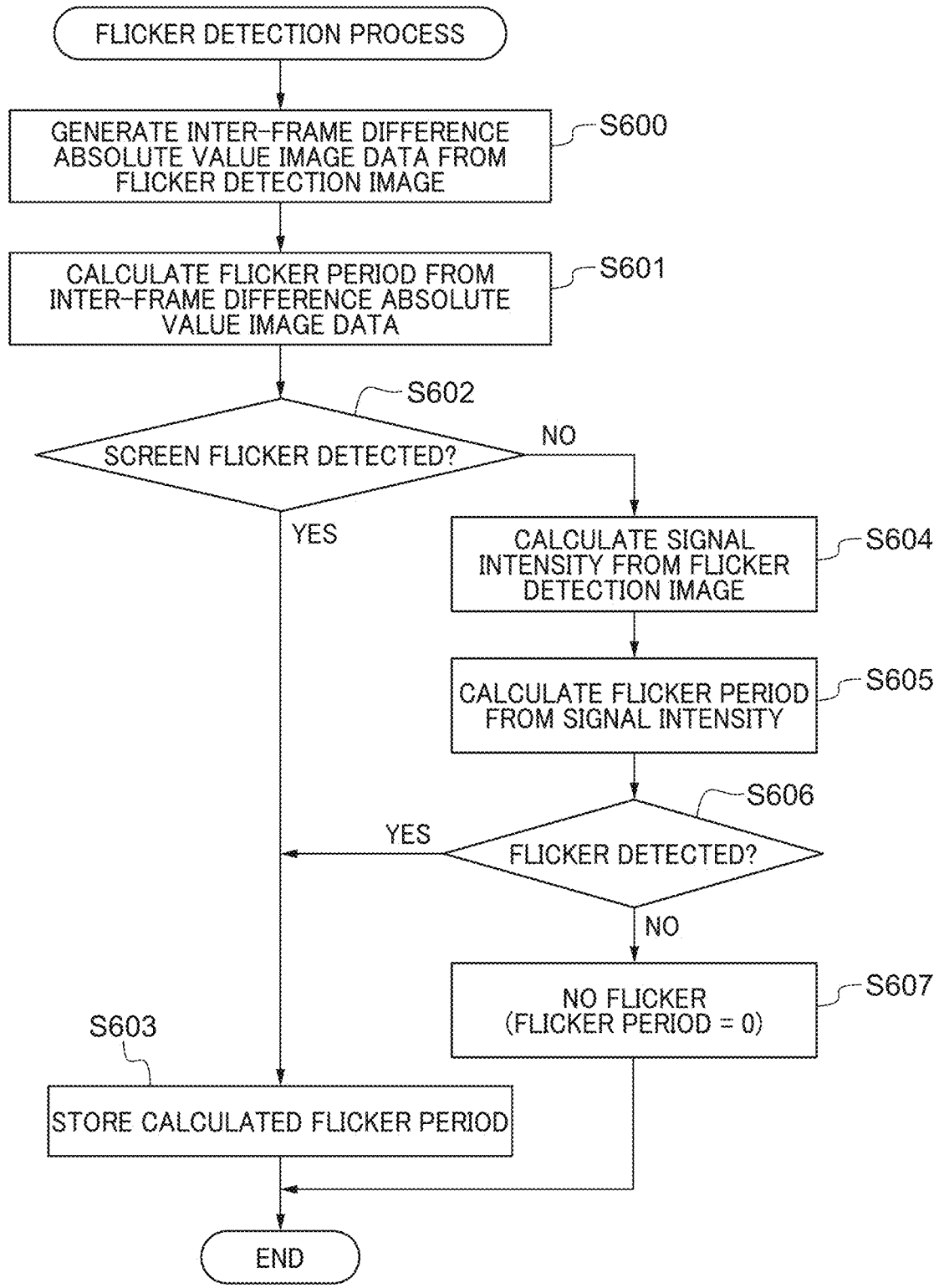
FIG. 8 is a flowchart of a flicker detection process.

FIG. 8 is a flowchart of the flicker detection process executed in the step S400 or S500. This process is realized by the controller 110 or by cooperation of the controller 110 and the flicker detection section 106.

In a step S600, the flicker detection section 106 generates inter-frame difference absolute value image data in which a difference absolute value is calculated on a pixel-by-pixel basis by using frames before and after the flicker detection image data (300 or 301). With this, it is possible to eliminate an influence of an object, and if flicker is generated, there is a change in the signal of the difference absolute value, and hence it is possible to mainly determine whether or not screen flicker is generated.

Figure 9:
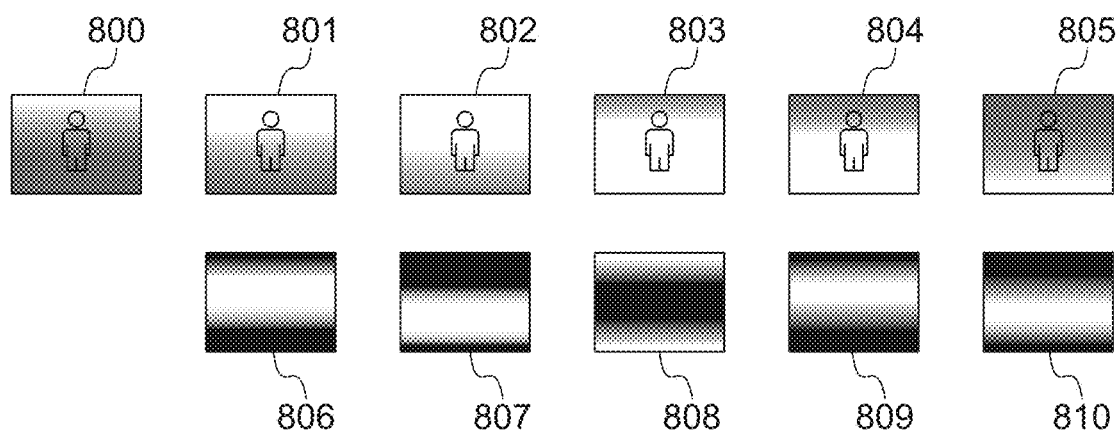
FIG. 9 is a diagram showing flicker detection image data of a plurality of frames.
Figure 10:
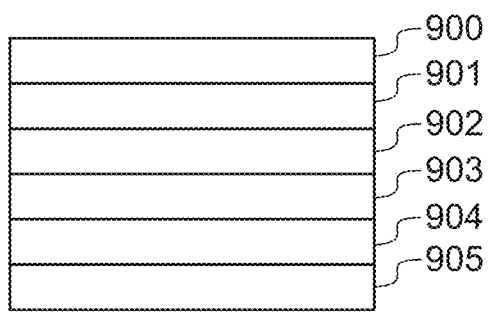
FIG. 10 is a conceptual diagram showing a state in which inter-frame difference absolute value image data is divided.
Figure 11:
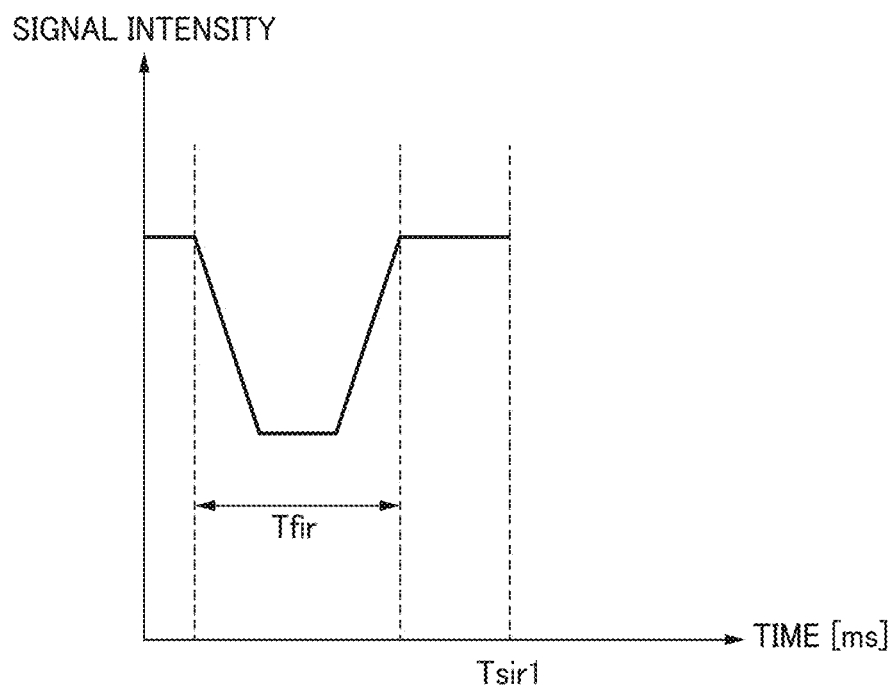
FIG. 11 is a diagram showing signal intensity of the inter-frame difference absolute value image data with respect to time.

FIG. 9 is a diagram showing flicker detection image data of a plurality of frames. FIGS. 9 to 11 each show the flicker detection image data 300 as an example of the flicker detection image data. Note that in the present embodiment, in the step S600 executed in the step S400 of the invisible light flicker process in FIG. 6, the flicker detection image data 300 is processed. In the step S600 executed in the step S500 of the visible light flicker process in FIG. 7, the flicker detection image data 301 is processed. Note that in a second embodiment, described hereinafter, the flicker detection image data items 300 and 301 are reversely used.

Referring to FIG. 9, image data items 800 to 805 are the flicker detection image data 300 and are image data items captured at the exposure times Tsir1 to Tsir6 (see FIG. 4). Image data items 806 to 810 are inter-frame difference absolute value image data. For example, the image data 806 is the inter-frame difference absolute value image data between the image data 800 and the image data 801 acquired after the image data 800. Similarly, the image data 807 is the inter-frame difference absolute value image data between the image data 801 and the image data 802. Similarly, the image data items 808, 809, and 810 are the inter-frame difference absolute value image data items between the image data items 802 and 803, between the image data items 803 and 804, and between the image data items 804 and 805, respectively.

In a step S601, the flicker detection section 106 calculates a flicker period from the inter-frame difference absolute value image data generated in the step S600. This flicker period calculation will be described with reference to FIGS. 10 and 11.

FIG. 10 is a conceptual diagram showing a state in which the inter-frame difference absolute value image data is divided. The flicker detection section 106 divides the inter-frame difference absolute value image data into a plurality of divided image data 900 to 905. Note that the number of divided data items is not particularly limited. Further, the flicker detection section 106 calculates a luminance integrated value with respect to each of the divided image data 900 to 905.

In a case where the flicker detection image data is the visible light image (flicker detection image data 301), the flicker detection section 106 integrates the luminance for each color, and a luminance Y is calculated by using an equation (8) based on the values of R, G, and B in the positional relationship e.g. shown in FIG. 2, and is set as the luminance integrated value:

$$Y = 0.299 * R + 0.587 * G + 0.114 * B \qquad (8)$$

Further, in a case where the flicker detection image data is the invisible light image (flicker detection image data 300), the flicker detection section 106 sets an Ir integrated value obtained by integrating the luminance values of all pixels as the luminance integrated value.

FIG. 11 is a diagram showing the signal intensity of the inter-frame difference absolute value image data with respect to time. FIG. 11 shows the signal intensity of the inter-frame difference absolute value image data 806 as a representative. Note that the integrated value of the divided image data 900 to 905 can be set as the signal intensity, or a value calculated by multiplying the integrated value with a coefficient can be set as the signal intensity. In the time represented by a horizontal axis, there is shown time calculated from the number of lines in the divided image data, by setting a time obtained by dividing the exposure time by the number of lines as the time for one line. From FIG. 11, a change time Tfir of the signal is detected as the flicker period. The change time Tfir is equal to twice the flicker period Tir indicated in FIG. 4.

Note that in FIG. 11, the description is given using the graph for convenience of explanation. However, in actuality, the controller 110 calculates the flicker period by finding a period from the maximum value to the maximum value or a period from the minimum value to the minimum value, using the signal intensities of the divided image data 900 to 905, which are calculated by the flicker detection section 106.

Figure 12:
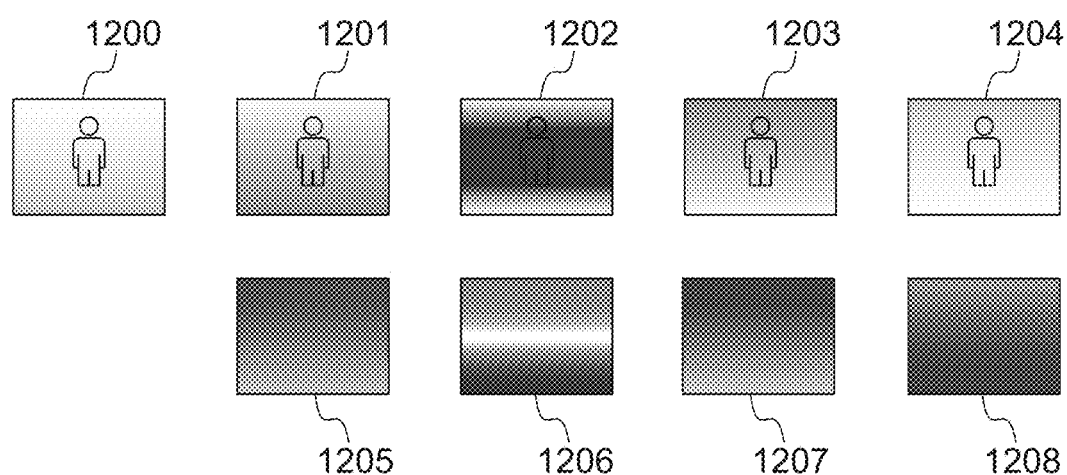
FIG. 12 is a diagram showing flicker detection image data of a plurality of frames.

FIG. 12 is a diagram showing flicker detection image data of a plurality of frames. FIG. 12 shows the flicker detection image data 301 as an example of the flicker detection image data.

Referring to FIG. 12, image date items 1200 to 1204 are the flicker detection image data 301, and image date items 1205 to 1208 are the inter-frame difference absolute value image data. For example, the image data 1205 is the inter-frame difference absolute value image data between the image data 1200 and the image data 1201 acquired after the image data 1200. Similarly, the image data items 1206, 1207, and 1208 are the inter-frame difference absolute value image data items between the image data items 1201 and 1202, between the image data items 1202 and 1203, and between the image data items 1203 and 1204, respectively.

In a step S602, the controller 110 determines whether or not screen flicker (lateral stripe flicker in one frame) is generated. Here, if a flicker period has been detected (calculated) in the step S601, it is determined that screen flicker is generated. Then, if screen flicker is generated (YES to the step S602), the controller 110 proceeds to a step S603, whereas if not (NO to the step S602), the controller 110 proceeds to a step S604.

In the illustrated example in FIG. 9, a series of a bright, a dark, and a bright, or a series of a dark, a bright, and a dark is generated in one screen in each of the image data items 806 to 810, and hence it is determined that screen flicker is generated. On the other hand, in the illustrated example in FIG. 12, neither a series of a bright, a dark, and a bright, nor a series of a dark, a bright, and a dark is generated in one screen in the image data items 1205, 1206, 1207, and 1208, and hence it is determined that screen flicker is not generated.

In the step S603, the controller 110 stores the flicker period calculated in the step S601 or S605 in the memory 109, followed by terminating the flicker detection process (FIG. 8).

In the step S604, the flicker detection section 106 calculates the signal intensity from the flicker detection image data. In a case where the flicker detection image data is a visible light image, the flicker detection section 106 integrates the luminance of pixels for each color with respect to the whole image, calculates the luminance Y by using the equation (8) based on the R, G, and B values in the positional relationship e.g. shown in FIG. 2, and sets the luminance Y as the luminance integrated value. In a case where the flicker detection image data is an invisible light image, the flicker detection section 106 integrates the luminance of all pixels as an Ir integrated value and sets this integrated value as the signal intensity or calculates a value calculated by multiplying the integrated value with a coefficient as the signal intensity. After execution of the step S604, the controller 110 proceeds to a step S605.

In the step S605, the controller 110 calculates the flicker period from the signal intensity obtained in the step S604 and proceeds to a step S606. This flicker period calculation will be described with reference to FIGS. 5 and 13.

Figure 13:
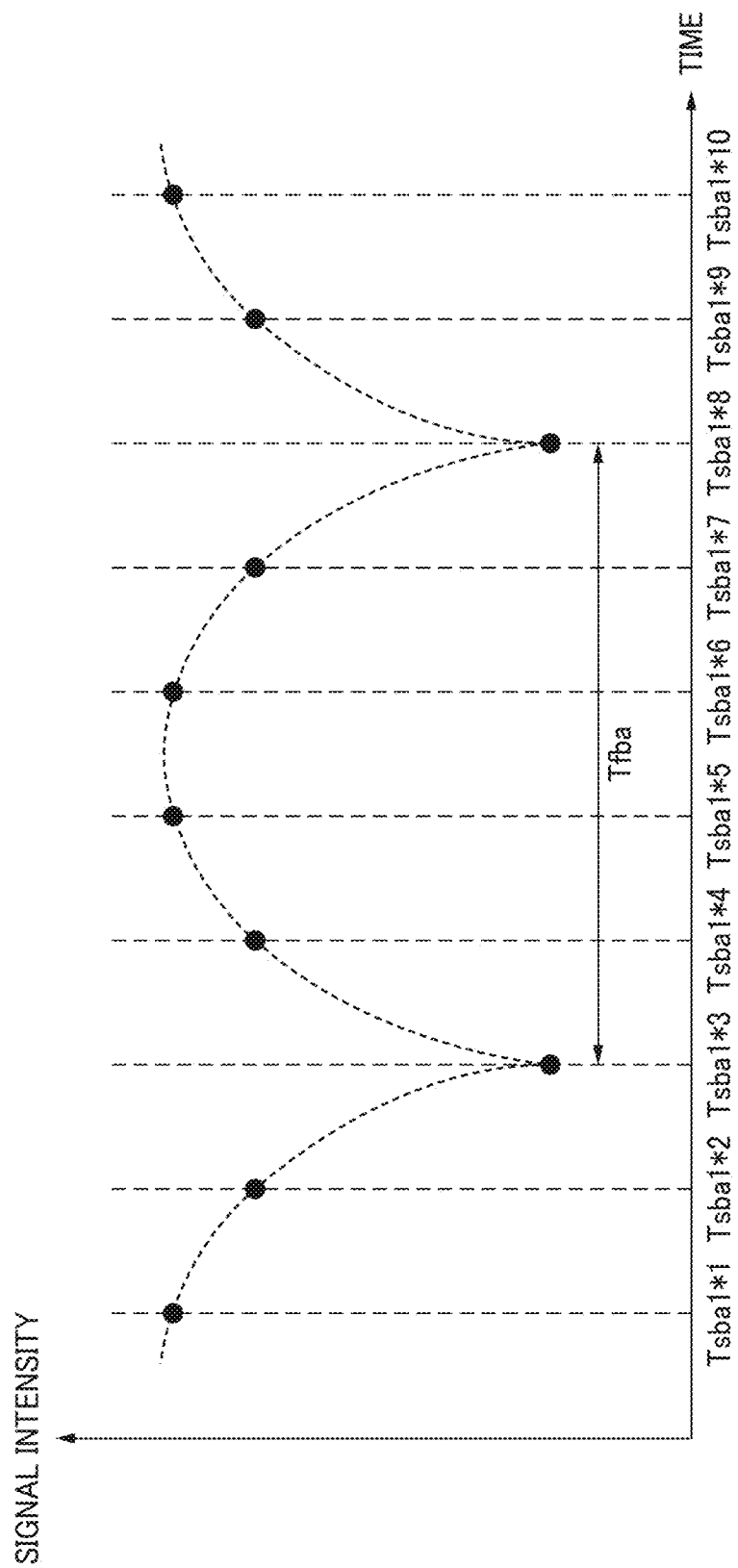
FIG. 13 is a diagram showing signal intensity of image data with respect to time.

FIG. 13 is a diagram showing the signal intensity of image data depicted with respect to time. In FIG. 13, a vertical axis represents the signal intensity and a horizontal axis represents the time. In FIG. 13, the signal intensities of the image data 1200 to 1204 indicated in FIG. 12 are plotted to the times Tsba1*1 to Tsba1*5, respectively. Note that the signal intensities of the image data (not shown) exposed during the exposure time from Tsba6 to Tsba10 indicated in FIG. 5 are plotted to the times Tsba1*6 to Tsba1*10, respectively.

From FIG. 13, a change time Tfba of the signal is detected as the flicker period. This change time Tfba is equal to the flicker period Tba indicated in FIG. 5.

Note that in FIG. 13, the description is given using the graph for convenience of explanation. However, in actuality, the controller 110 calculates the flicker period by finding a period from the maximum value to the maximum value or a period from the minimum value to the minimum value, using the signal intensities calculated by the flicker detection section 106.

In the step S606, the controller 110 determines whether or not flicker is generated. Here, if a flicker period has been found (can be calculated) in the step S605, it is determined that flicker is generated. Then, if flicker is generated (YES to the step S606), the controller 110 proceeds to the step S603, whereas if not (NO to the step S606), the controller 110 proceeds to a step S607.

In the step S607, the controller 110 stores information to the effect that flicker is not generated in the memory 109, followed by terminating the flicker detection process (FIG. 8). The information to the effect that flicker is not generated is e.g. information indicating that the flicker period is equal to 0.

Note that in a case where the operation is shifted to the actual photographing after the flicker suppression process (see FIG. 3) has been repeatedly executed a plurality of number of times, the photographing is executed in a state in which the exposure control employed in the step S502 in FIG. 7, executed last, is applied.

According to the present embodiment, the controller 110 executes the visible light flicker process 303 (second process) after execution of the invisible light flicker process 302 (first process). In the invisible light flicker process 302, the controller 110 controls the flicker detection section 106 to detect the invisible light flicker period from the flicker detection image data 300 (invisible light image) (S400). The controller 110 controls the image sensor 100 to prevent the invisible light flicker from being generated in an image output from the image sensor 100, based on the detected invisible light flicker period (S402). Next, in the visible light flicker process 303, the controller 110 acquires the flicker detection image data 301 (visible light image) separated in a state in which the image sensor 100 is controlled to prevent the invisible light flicker from being generated in an image output from the image sensor 100. Then, in the visible light flicker process 303, the controller 110 controls the flicker detection section 106 to detect a visible light flicker period from the flicker detection image data 301 (S500). Then, the controller 110 controls the image sensor 100 to prevent the invisible light flicker and the visible light flicker from being generated in an image output from the image sensor 100, based on the invisible light flicker period and the visible light flicker period (S502).

This makes it possible to obtain an image in which the influence of flicker of the invisible or visible light is suppressed. Further, the infrared filter, which is generally inserted when detecting flicker, is not required, and hence costs are suppressed. Therefore, it is possible to suppress the influence of flicker with low costs even under a situation where flicker of the invisible or visible light is generated.

Further, by repeatedly executing the invisible light flicker process 302 and the visible light flicker process 303 a plurality of number of times, it is possible to enhance the accuracy of detecting the flicker period and more accurately suppress the influence of flicker.

Further, in the step S502, the controller 110 controls the image sensor 100 such that the exposure time becomes equal to a common multiple of the visible light flicker period and the invisible light flicker period, and hence it is possible to more accurately suppress the influence of flicker.

Next, a variation of the first embodiment will be described.

In the first embodiment, since the shutter speed is set to the above-mentioned common multiple in the step S502, the shutter speed is restricted. In view of this, in this variation, in the step S402 in FIG. 6, when the invisible light pixel-separating section 101 separates the image output from the image sensor 100, "flicker correction" is applied in place of the exposure control. The flicker correction is processing for digitally eliminating flicker.

Specifically, in the flicker correction, the controller 110 switches the coefficients $\alpha r$, $\alpha g$, and $\alpha b$ in the above equations (1), (2), and (3), which are applied to the invisible light pixel-separating section 101, on a line-by-line basis or on a several lines-to-several lines basis. Then, the controller 110 eliminates the invisible light flicker by setting the coefficients of lines as dark lines such that the dark lines have the same brightness as the bright lines, based on the invisible light flicker period.

Further, in acquisition of the flicker detection image data 301 used in the visible light flicker process (FIG. 7), the flicker correction is applied in a stage in which the invisible light pixel-separating section 101 separates the output image. Therefore, by performing the flicker correction, the flicker detection image data 301 in which the invisible light flicker has been reduced is acquired.

In the step S502 executed in this case, the controller 110 is only required to perform the exposure control based on the visible light flicker period such that the blinking period of the visible light source is avoided. This is because the invisible light flicker has been eliminated in the stage in which the flicker detection image data 301 is acquired, and hence the controller 110 can focus only on elimination of the visible light flicker. Therefore, for example, the shutter speed is only required to be set to the same value as the visible light flicker period. Note that in a case where the visible light flicker is screen flicker, not the exposure control, but the flicker correction can be applied.

Note that in a case where the operation is shifted to the actual photographing after the flicker suppression process (see FIG. 3) has been repeatedly executed a plurality of number of times, the exposure control (or the flicker correction) employed in the step S502 in FIG. 7, which was executed last, is applied.

Thus, according to this variation, it is also possible to obtain the same advantageous effects as provided by the first embodiment in suppressing the influence of flicker with low costs even under a situation where flicker of invisible or visible light is generated.

Next, the second embodiment of the present invention will be described. In the second embodiment, in the flicker suppression process, the execution order of the invisible light flicker process and the visible light flicker process is inversed from the first embodiment. Therefore, in the present embodiment, a flicker suppression process (FIG. 14) is applied to the first embodiment in place of the flicker suppression process (FIG. 3). Further, an invisible light flicker process (FIG. 16) and a visible light flicker process (FIG. 15) are applied in place of the invisible light flicker process (FIG. 6) and the visible light flicker process (FIG. 7). The second embodiment is the same in the other configuration as the first embodiment.

Figure 14:
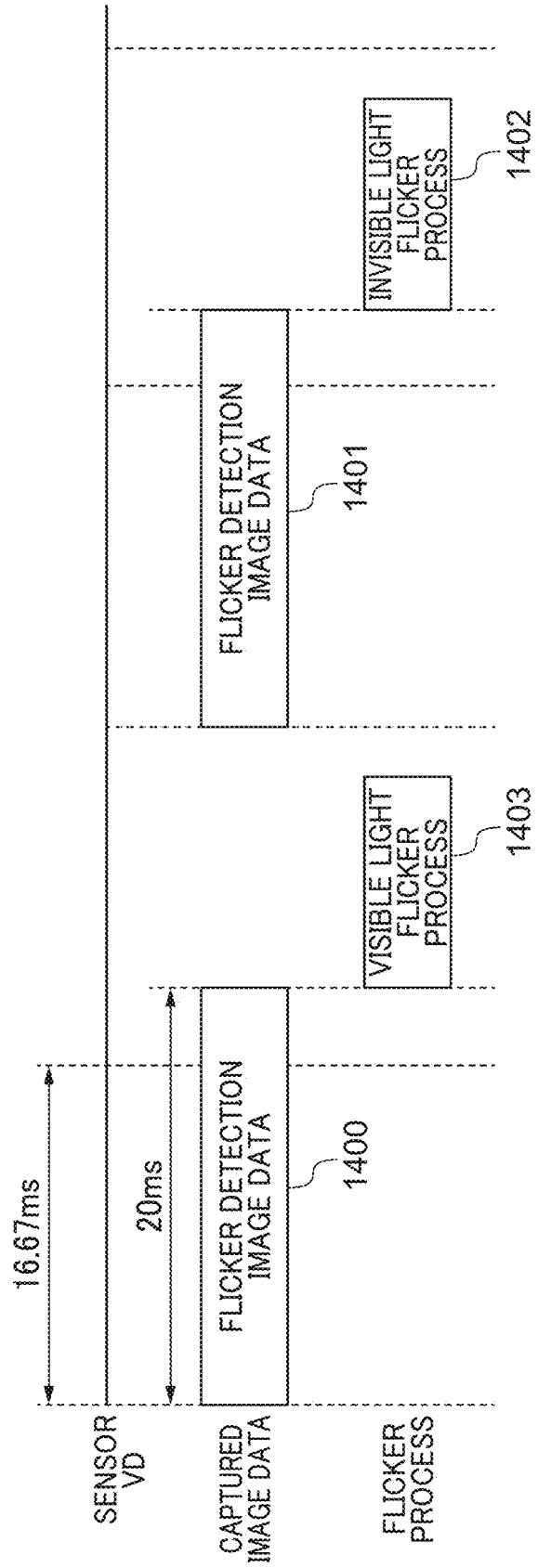
FIG. 14 is a timing diagram of a flicker suppression process in a second embodiment.

FIG. 14 is a timing diagram of the flicker suppression process. Flicker detection image data 1400 is an image for visible light flicker detection, and flicker detection image data 1401 is an image for invisible light flicker detection. Therefore, the flicker detection image data 1400 and 1401 correspond to the flicker detection image data 301 and 300, shown in FIG. 3, respectively. An invisible light flicker process 1402 and a visible light flicker process 1403 correspond to the invisible light flicker process 302 and the visible light flicker process 303, shown in FIG. 3, respectively. The flicker suppression process is executed at least once.

In the present embodiment, the controller 110 executes the invisible light flicker process 1402 (first process) after execution of the visible light flicker process 1403 (second process).

An outline of the process is as follows: By acquiring the flicker detection image data 1400, and executing the visible light flicker process 1403 by using the flicker detection image data 1400 (described hereinafter with reference to FIG. 15), the visible light flicker period is detected. Then, the flicker detection image data 1401 is acquired based on the detected visible light flicker period under a condition in which the visible light flicker is suppressed. Then, by executing the invisible light flicker process 1402 (described hereinafter with reference to FIG. 16) using the flicker detection image data 1401, the invisible light flicker period is detected. Then, the image sensor 100 is controlled based on the invisible light flicker period and the visible light flicker period, whereby an image on which the invisible light flicker and the visible light flicker are both suppressed is obtained.

Figure 15:
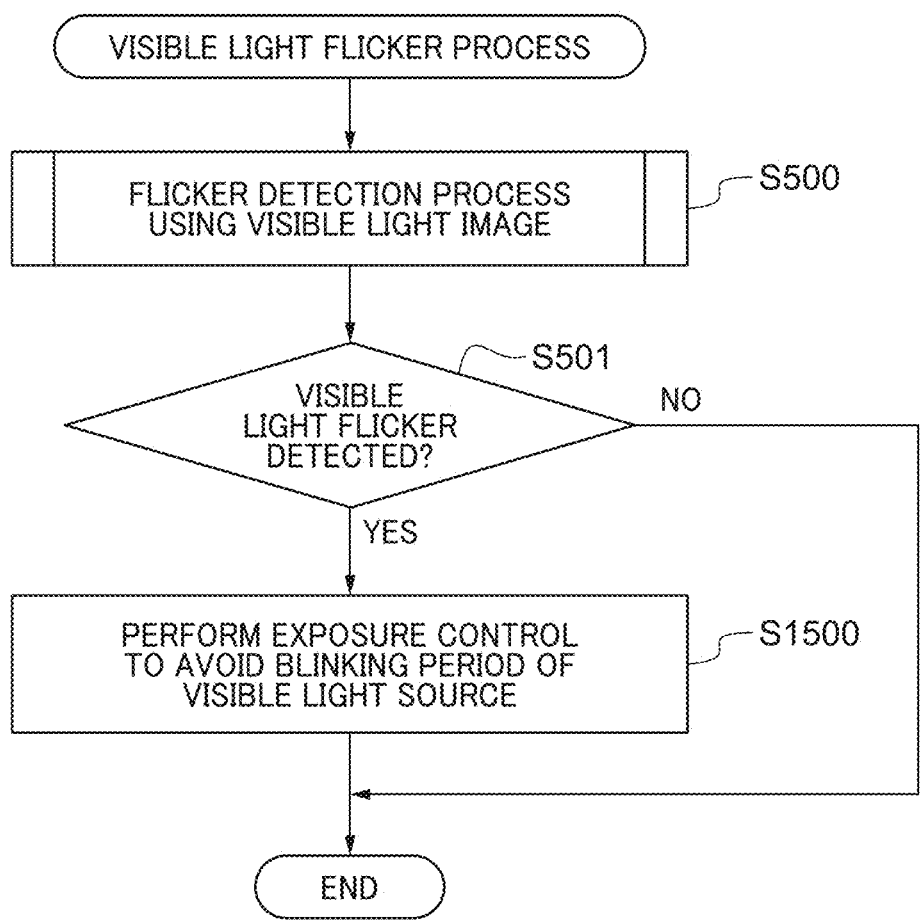
FIG. 15 is a flowchart of a visible light flicker process in the second embodiment.

FIG. 15 is a flowchart of the visible light flicker process. The execution unit and the execution condition of this process are the same as those of the visible light flicker process in FIG. 7. The processing operations in the steps S500 and S501 are the same as those described with reference to FIG. 7.

When the flicker detection image data 1400 used in the step S500 is acquired, exposure is performed 12 times during 20 ms, and the one exposure time is set to 1.67 ms (=20 ms/12). Note that adding the number of pixels in the horizontal direction and thinning the number of pixels in the vertical direction within the sensor, and using thinned vertical line for the LV display, can be applied, similar to the first embodiment.

If it is determined in the step S501 that visible light flicker is not generated (NO to the step S501), the controller 110 terminates the visible light flicker process (FIG. 15). If it is determined that visible light flicker is generated (YES to the step S501), the controller 110 proceeds to a step S1500.

In the step S1500, the controller 110 controls the image sensor 100 such that the visible light flicker is not generated in a captured image, based on the visible light flicker period detected in the step S500, followed by terminating the visible light flicker process (FIG. 15). For example, the controller 110 performs the exposure control by using the electronic shutter or mechanical shutter, not shown, of the image sensor 100, such that the blinking period of the visible light source is avoided. Specifically, the controller 110 can set the shutter speed to the same value as the visible light flicker period.

Figure 16:
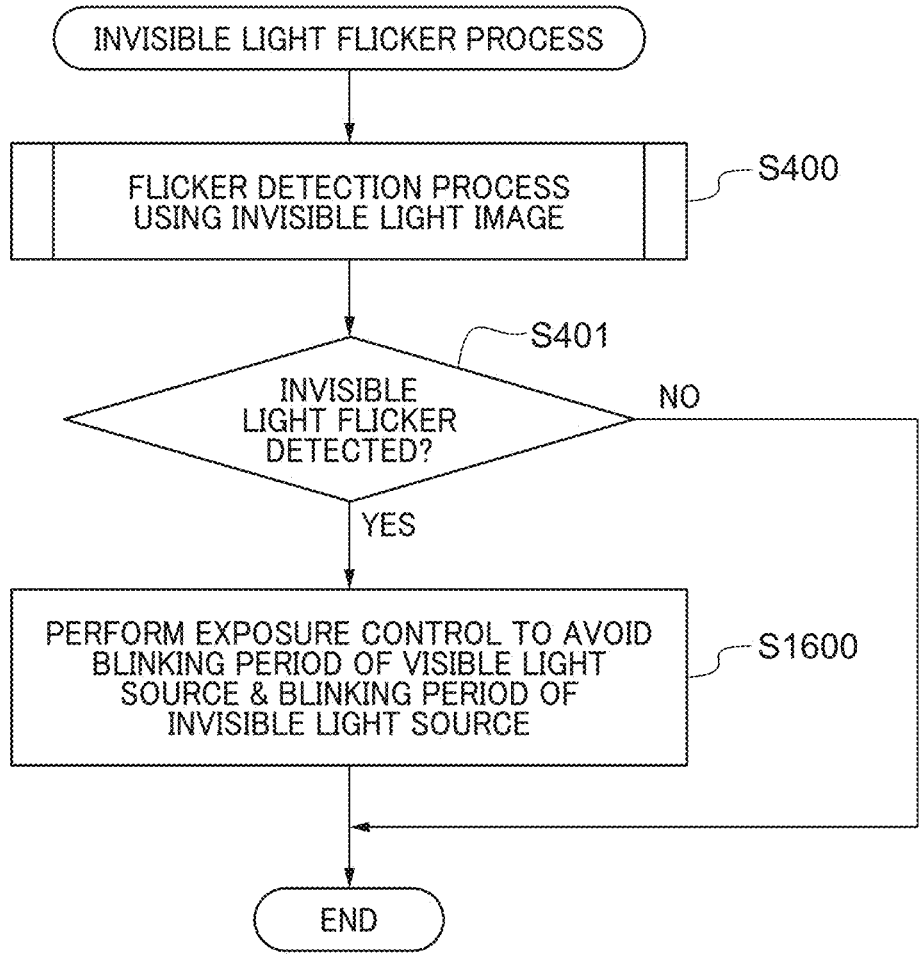
FIG. 16 is a flowchart of an invisible light flicker process in the second embodiment.

FIG. 16 is a flowchart of the invisible light flicker process. The execution unit and the execution condition of this process are the same as those of the invisible light flicker process in FIG. 6. The processing operations in the steps S400 and S401 are the same as those described with reference to FIG. 6.

If it is determined in the step S401 that invisible light flicker is not generated (NO to the step S401), the controller 110 terminates the invisible light flicker process (FIG. 16). If it is determined that invisible light flicker is generated (YES to the step S401), the controller 110 proceeds to a step S1600.

In the step S1600, the controller 110 controls the image sensor 100 based on the invisible light flicker period detected in the step S400 and the visible light flicker period detected in the step S500. That is, the controller 110 controls the image sensor 100 such that the invisible light flicker and the visible light flicker are not generated in a captured image, followed by terminating the invisible light flicker process (FIG. 16). For example, the controller 110 performs the exposure control, based on a common multiple of the visible light flicker period and the invisible light flicker period, by using the electronic shutter or mechanical shutter, not shown, of the image sensor 100 such that the blinking periods of the invisible light source and the visible light source are avoided. Specifically, the controller 110 can set the shutter speed to the same value as the common multiple (such as the least common multiple) of the invisible light flicker period and the visible light flicker period.

According to the present embodiment, it is possible to obtain the same advantageous effects as provided by the first embodiment, in suppressing the influence of flicker with low costs even under a situation where flicker of invisible or visible light is generated.

Next, a variation of the second embodiment will be described.

In the second embodiment, by setting the shutter speed to the above-mentioned common multiple in the step S1600, the shutter speed is restricted. In view of this, in this variation, in the step S1500 in FIG. 15, the above-described flicker correction is applied in place of the exposure control.

Further, in acquisition of the flicker detection image data 1401 used in the invisible light flicker process (FIG. 16), the flicker correction is applied in a stage in which the invisible light pixel-separating section 101 separates the output image. Therefore, by performing the flicker correction, the flicker detection image data 1401 in which the visible light flicker has been reduced is acquired.

In the step S1600 executed in this case, the controller 110 can perform the exposure control, based on the invisible light flicker period, such that the blinking period of the invisible light source is avoided. This is because the visible light flicker has been eliminated in the stage in which the flicker detection image data 1401 is acquired, and hence the controller 110 can focus only on elimination of the invisible light flicker. Therefore, for example, the shutter speed can be set to the same value as the invisible light flicker period.

Note that in a case where the operation is shifted to the actual photographing after the flicker suppression process (see FIG. 14) has been repeatedly executed a plurality of number of times, the exposure control (or the flicker correction) employed in the step S1600 in FIG. 16, which was executed last, is applied.

Thus, according to this variation, it is possible to obtain the same advantageous effects as provided by the second embodiment in suppressing the influence of flicker with low costs even under a situation where flicker of invisible or visible light is generated.

In the first embodiment, the invisible light flicker process 302 (FIG. 6) corresponds to the first process in the present invention, and the visible light flicker process 303 (FIG. 7) corresponds to the second process in the present invention. However, a combination of acquisition of the flicker detection image data 300 and the invisible light flicker process 302 (FIG. 6) can be set as the first process in the present invention. Further, a combination of acquisition of the flicker detection image data 301 and the visible light flicker process 303 (FIG. 7) can be set as the second process in the present invention.

Similarly, also in the second embodiment, a combination of acquisition of the flicker detection image data 1401 and the invisible light flicker process 1402 (FIG. 16) can be set as the first process in the present invention. Further, a combination of acquisition of the flicker detection image data 1400 and the visible light flicker process 1403 (FIG. 15) can be set as the second process in the present invention.

Note that although in the above-described embodiments, the description is given assuming that the invisible light flicker is the screen flicker, and the visible light flicker is the flicker, the invisible light flicker can be the flicker, and further, the visible light flicker can be the screen flicker. Alternatively, even in a case where the invisible light flicker and the visible light flicker each have both of types of flicker, the present invention can also be applied.

Note that the above-described methods of detecting presence/absence of flicker and a flicker period have been described by way of example, but any other suitable method can be employed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-120621 filed Jul. 25, 2023, which is hereby incorporated by reference herein in its entirety.

What is claimed is:

1. An apparatus comprising:
    an image sensor that photoelectrically converts visible light and invisible light; and
    a memory coupled to the at least one processor, the memory having instructions that, when executed by the at least one processor, perform the operations as:
    a separation unit configured to separate image data output by the image sensor into visible light image data and invisible light image data;
    a detection unit configured to detect flicker; and
    a control unit configured to execute a second process after execution of a first process,
    wherein in the first process, the control unit causes the detection unit to detect a flicker period of invisible light from the invisible light image data and controls the image sensor, based on the detected flicker period of invisible light, such that flicker of invisible light is not generated in the image data, and in the second process, the control unit causes the detection unit to detect a flicker period of visible light from the visible light image data separated in a state in which the image sensor is controlled such that flicker of invisible light is not generated in the image data, and controls the image sensor, based on the flicker period of invisible light and the detected flicker period of visible light, such hat flicker of invisible light and flicker of visible light from are not generated in the image data.

2. The apparatus according to claim 1, wherein when separating the visible light image data and the invisible light image data, the separation unit corrects pixel values of the visible light image data using the invisible light image data.

3. The apparatus according to claim 1, wherein when separating the visible light image data and the invisible light image data, the separation unit corrects pixel values of the invisible light image data using the visible light image data.

4. The apparatus according to claim 1, wherein the control unit repeatedly executes the first process and the second process a plurality of number of times.

5. The apparatus according to claim 1, wherein, in the second process, when controlling the image sensor such that flicker of invisible light and flicker of visible light are not generated in the image data, the control unit controls the image sensor such that an exposure time becomes equal to a common multiple of the flicker period of visible light and the flicker period of invisible light.

6. An apparatus comprising:
    an image sensor that photoelectrically converts visible light and invisible light; and
    a memory coupled to the at least one processor, the memory having instructions that, when executed by the at least one processor, perform the operations as:
    a separation unit configured to separate image data output by the image sensor into visible light image data and invisible light image data;
    a detection unit configured to detect flicker; and
    a control unit configured to execute a second process after execution of a first process,
    wherein in the first process, the control unit causes the detection unit to detect a flicker period of invisible light from the invisible light image data, and thereafter, when separating the image data output by the image sensor, the control unit applies flicker correction for reducing flicker of invisible light based on the detected flicker period of invisible light, and in the second process, the control unit causes the detection unit to detect a flicker period of visible light from the visible light image data separated in a state in which the flicker correction has been applied, and controls the image sensor, based on the detected flicker period of visible light, such that flicker of visible light is not generated in the image data.

7. The apparatus according to claim 6, wherein when separating the visible light image data and the invisible light image data, the separation unit corrects pixel values of the visible light image data using the invisible light image data.

8. The apparatus according to claim 6, wherein when separating the visible light image data and the invisible light image data, the separation unit corrects pixel values of the invisible light image data using the visible light image data.

9. The apparatus according to claim 6, wherein the control unit repeatedly executes the first process and the second process a plurality of number of times.

10. An apparatus comprising:
an image sensor that photoelectrically converts visible light and invisible light; and
a memory coupled to the at least one processor, the memory having instructions that, when executed by the at least one processor, perform the operations as:
a separation unit configured to separate image data output by the image sensor into visible light image data and invisible light image data;
a detection unit configured to detect flicker; and
a control unit configured to execute a first process after execution of a second process,
wherein in the second process, the control unit causes the detection unit to detect a flicker period of visible light from the visible light image data, and controls the image sensor, based on the detected flicker period of visible light, such that flicker of visible light is not generated in the image data, and in the first process, the control unit causes the detection unit to detect a flicker period of invisible light from the invisible light image data separated in a state in which the image sensor is controlled such that flicker of visible light is not generated in the image data, and controls the image sensor, based on the flicker period of visible light and the detected flicker period of invisible light, such that flicker of invisible light and flicker of visible light are not generated in the image data.

11. An apparatus comprising:
an image sensor that photoelectrically converts visible light and invisible light; and
a memory coupled to the at least one processor, the memory having instructions that, when executed by the at least one processor, perform the operations as:
a separation unit configured to separate image data output by the image sensor into visible light image data and invisible light image data;
a detection unit configured to detect flicker; and
a control unit configured to execute a first process after execution of a second process,
wherein in the second process, the control unit causes the detection unit to detect a flicker period of visible light from the visible light image data, and thereafter, when separating the image data output by the image sensor, the control unit applies flicker correction for reducing flicker of visible light based on the detected flicker period of visible light, and in the first process, the control unit causes the detection unit to detect a flicker period of invisible light from the invisible light image data separated in a state in which the flicker correction has been applied, and controls the image sensor, based on the detected flicker period of invisible light, such that flicker of invisible light is not generated in the image data.

12. A method of controlling an apparatus that includes an image sensor for outputting image data including visible light and invisible light, separates the image data output by the image sensor into visible light image data and invisible light image data, and detects flicker, comprising:

executing a first process for detecting a flicker period of invisible light from the invisible light image data, and controlling the image sensor, based on the detected flicker period of invisible light, such that flicker of invisible light is not generated in the image data; and
executing, after execution of the first process, a second process for detecting a flicker period of visible light from the visible light image data separated in a state in which the image sensor is controlled such that flicker of invisible light is not generated in the image data, and controlling the image sensor, based on the flicker period of invisible light and the detected flicker period of visible light, such that flicker of invisible light and flicker of visible light from are not generated in the image data.

13. A method of controlling an apparatus that includes an image sensor for outputting image data including visible light and invisible light, separates the image data output by the image sensor into visible light image data and invisible light image data, and detects flicker, comprising:
executing a first process for detecting a flicker period of invisible light from the invisible light image data, and thereafter, when separating the image data output by the image sensor, applying flicker correction for reducing flicker of invisible light based on the detected flicker period of invisible light; and
executing, after execution of the first process, a second process for detecting a flicker period of visible light from the visible light image data separated in a state in which the flicker correction has been applied, and controlling the image sensor, based on the detected flicker period of visible light, such that flicker of visible light is not generated in the image data.

14. A method of controlling an apparatus that includes an image sensor for outputting image data including visible light and invisible light, separates the image data output by the image sensor into visible light image data and invisible light image data, and detects flicker, comprising:
executing a second process for detecting a flicker period of visible light from the visible light image data, and controlling the image sensor, based on the detected flicker period of visible light, such that flicker of visible light is not generated in the image data; and
executing, after execution of the second process, a first process for detecting a flicker period of invisible light from the invisible light image data separated in a state in which the image sensor is controlled such that flicker of visible light is not generated in the image data, and controlling the image sensor, based on the flicker period of visible light and the detected flicker period of invisible light, such that flicker of invisible light and flicker of visible light are not generated in the image data.

15. A method of controlling an apparatus that includes an image sensor for outputting image data including visible light and invisible light, separates the image data output by the image sensor into visible light image data and invisible light image data, and detects flicker, comprising:
executing a second process for detecting a flicker period of visible light from the visible light image data, and thereafter applying, when the image data output by the image sensor, flicker correction for reducing flicker of visible light based on the detected flicker period of visible light; and
executing, after execution of the second process, a first process for detecting a flicker period of invisible light from the invisible light image data separated in a state in which the flicker correction has been applied, and controlling the image sensor, based on the detected flicker period of invisible light, such that flicker of invisible light from is not generated in the image data.

\* \* \* \* \*